March 6, 1934.  A. R. THOMPSON  1,949,767
CAN GRADER
Filed May 9, 1932  2 Sheets-Sheet 1

INVENTOR.
Albert. R. Thompson.
BY
Philip A. Minnis
ATTORNEY.

March 6, 1934.   A. R. THOMPSON   1,949,767
CAN GRADER
Filed May 9, 1932   2 Sheets-Sheet 2

INVENTOR.
Albert R. Thompson.
BY Philip A. Minnis
ATTORNEY.

Patented Mar. 6, 1934

1,949,767

UNITED STATES PATENT OFFICE 1,949,767

CAN GRADER

Albert E. Thompson, San Jose, Calif., assignor to Food Machinery Corporation, San Jose, Calif., a corporation of Delaware Application May 9, 1932, Serial No. 610,052

9 Claims. (Cl. 209—87)

This invention relates in general to can handling machinery and is particularly concerned with an apparatus for testing cans, either filled or empty, and separating the dented or misshapen cans from the good ones.

The construction of modern high speed can handling machinery is such that a dented or imperfectly shaped can delivered thereto is apt to interfere with its proper operation, and may result in serious delays, losses of product or damage to machinery. For example, the introduction of a misshapen can into the canway of a continuous pressure cooker or cooler, such as used in the canning industry for processing canned foodstuffs, is not infrequently the cause of a jam which makes it necessary to discontinue immediately operation of the machine if serious damage thereto is to be avoided. It then becomes necessary to open up the pressure chamber in order to reach and remove the obstructing can, thereby releasing the pressure and causing the loss of the partially processed product filled cans in the machine at the time. Considering the fact that an ordinary pressure cooker of average size may hold anywhere from one thousand to five thousand cans at a time, it will be appreciated that their loss carries with them a considerable investment.

The importance of separating out the deformed cans from the good ones is thus apparent, and it is the principal object of this invention to provide an apparatus for automatically effecting such a separation and segregating the two classes of cans.

This may be accomplished by taking advantage of the fact that the diameter of a can is increased when it is dented or otherwise deformed, so that by gauging the diameters of the cans, those which are dented or deformed may be detected by reason of their abnormal diameters and separated from the good cans. This principle is utilized in the present invention by providing a continuously operable gauging means designed to successively embrace the individual cans of a moving procession and automatically segregate them according to differences in their diameters.

The several features of the invention will be more readily understood by reference to the accompanying drawings, in which.

Figure 1:
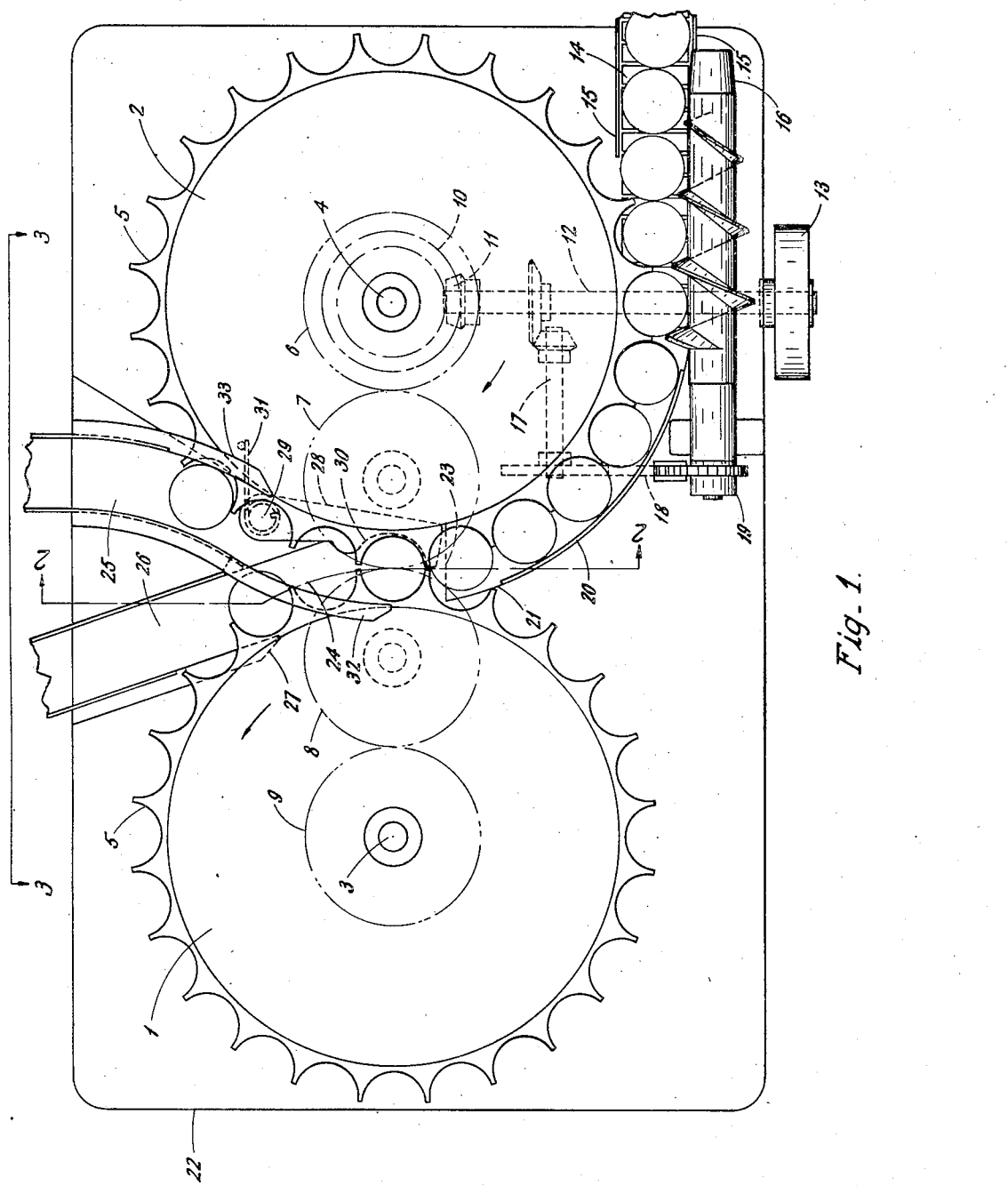
Figure 1 is a plan view of an apparatus embodying the principles of the invention.
Figure 2:
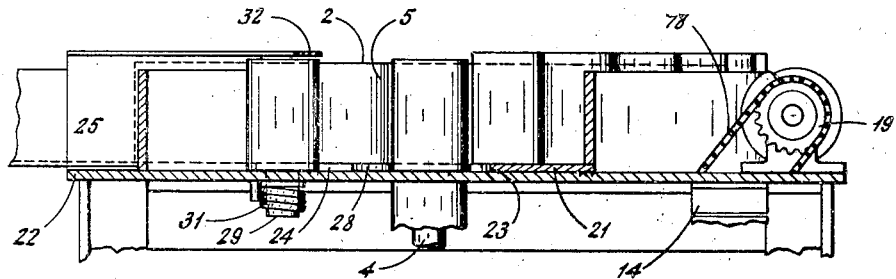
Figure 2 is a sectional elevation taken along the line 2—2 of Figure 1.
Figure 3:
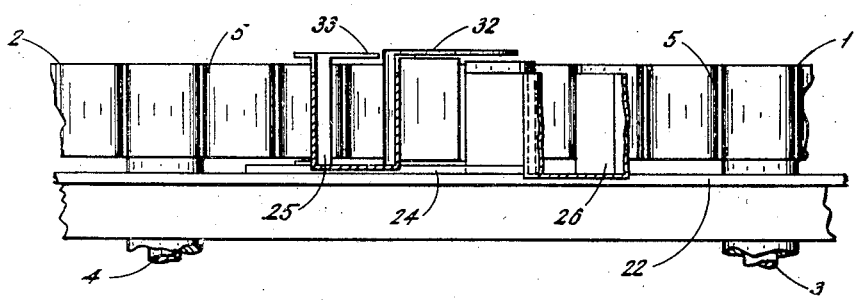
Figure 3 is a side elevation as seen from the line 3—3 of Figure 1.

Referring to the drawings, the apparatus illustrated comprises a pair of tangentially arranged rotary turrets 1 and 2, respectively keyed to the upper ends of vertical drive shafts 3 and 4. A plurality of semi-cylindrical can receiving pockets 5 are cut in the periphery of each turret, and the turrets are driven in timed relation so that each pocket, as it arrives at the point of tangency of the turrets, comes into registry with a pocket directly opposite on the other turret to form a cylindrical sleeve suitable for gauging the outside diameter of a can. The radius of each pocket 5 is such that the diameter of the sleeve thus formed is just enough larger than the outside diameter of a perfect can of the size to be tested that such a can, when placed in the sleeve, may slide downwardly therethrough by gravity, but the same can, when dented so as to slightly increase its diameter, will be held in place between the cooperating pockets.

The turrets are geared together by gears 6, 7, 8, and 9, and are rotated by means of a bevel gear 10 splined to the turret shaft 4 and engaged by a pinion 11 on the drive shaft 12. The latter carries at its outer end a pulley 13, which may be driven from any suitable source of power.

The cans to be tested are delivered to the can receiving pockets of the gauging turrets by means of an endless conveyor 14 driven from the shaft 12. Suitable guide rails 15 adjacent the conveyor maintain the cans in single file, and a timing worm 16, driven from the countershaft 17 by means of a chain 18 passing around the sprocket wheel 19, engages the cans on the conveyor as they approach the pockets of the turret 2 and properly times and spaces them for engagement by the pockets. After the cans have been placed in the pockets by the conveyor and timing worm they are held in place by the curved guide rail 20 until they approach the point of tangency of the turrets.

As the cans are carried away from the conveyor 14 by the turret 2 they are supported by a plate 21 superposed upon the surface of the table 22 in such manner that the can tops project a short distance above the top faces of the turrets, this plate 21 extending toward the point where the gauging sleeve is formed and terminating just short thereof, as indicated at 23. A second plate 24, of the same thickness as the plate 21, overlies the table 22 beyond the point where the gauging sleeve is formed and forms the bottom of a chute 25 into which the dented cans are directed, while acting also as a guide to divert good cans toward the chute 26. A stripping finger 27 extending beneath the turret 1 serves to strip the good cans from the pockets 5 and direct them into the chute 26.

By the construction thus far described it will be seen that the cans are delivered by the conveyor 14 to the can receiving pockets of the turret 2 and are carried over the plate 21 until just prior to being embraced in the sleeve formed by the opposed can receiving pockets 5 of the adjacent turrets. The plate 21 being cut away at this point, the good cans slide downwardly through the sleeve upon the table 22 whereupon, as they are pushed over the table they engage the edge of the plate 24 and are directed toward the chute 26. Finally, they are stripped from the pockets of the turret 1 by the finger 27 and guided into the chute 26, from whence they may be delivered to any desired point.

In order to provide for the separation of the dented cans from the good ones, a gate 28, of the same thickness as the plates 21 and 24, is pivoted to the table 22 at 29 and extends across the gap between ends of the plates beneath the point where the gauging sleeves are formed. A semi-circular pocket 30 is cut from the inner face of the gate, and a spring 31 normally holds the gate inwardly with the pocket directly under the gauging sleeve, so that when a perfect can is carried thereover it drops through the sleeve into the pocket 30 and rests upon the table 22.

The length of the pocket 30 is preferably slightly larger than the diameter of the cans, in order to allow for the short distance the cans are carried forwardly while they slide through the gauging sleeve. The exact length of the pocket will depend upon the speed at which the machine is designed to run, but for successful operation it is important that it be not larger than necessary to insure that there will be just sufficient time for a perfect can to slide downwardly through the gauging sleeve after it moves over the pocket and to rest upon the table 22 without interference by the gate 28. After the can has dropped into this position as it moves forwardly it engages the gate and pushes it aside while passing, whereupon the spring 31 returns the gate to its normal position. Thus, during the travel through the machine of a procession of perfectly shaped cans, the gate 28 is reciprocated forwardly and backwardly as the cans push it aside and are carried forwardly adjacent the edge of the plate 24 by the pockets of the turret 1.

Figure 4:
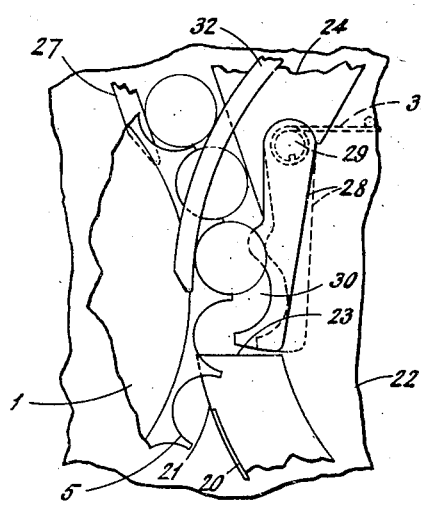
Figure 4 is a view of a portion of the mechanism shown in Figure 1 but with the parts in a different position.

It will be noted, however, that should a dented or otherwise deformed can be delivered to the gauging sleeve it will be prevented from dropping through on account of its abnormal diameter until the rotation of the turrets causes the pockets to diverge sufficiently to release the can. By this time the forward edge of the can will have been carried past the edge of the pocket in the gate 28, so that when the can is finally released it cannot fall upon the table 22 but is supported by the top of the gate, as illustrated in Figure 4, and in substantially upright position by the pocket in turret 1, which has not receded far enough away from the can at this point to let its free edge down upon the table 22. Thus the top of the can continues to project above the turrets whereby, as it is carried forwardly by the now diverging pockets, it is engaged by the guide 32, extending across the top surface of the turret 1 at the proper elevation to engage the tops of cans which are supported by the gate 28 but to clear the tops of cans resting upon the table 22. As the can is further advanced it is diverted up onto the plate 24 to the mouth of the chute 25. Another guide 33 serves to strip the cans from the pockets of turret 2 and direct them into the chute 25.

The operation of the apparatus will now be apparent. The cans to be tested are delivered in a continuous file over the conveyor 14 and positioned in the pockets of the turret 2 by the timing screw 16. As the cans are carried around by the turret 2 the pockets of the adjacent turrets converge until at the point of tangency of the turrets they form a gauging sleeve which embraces each successive can. If the can is a perfect one it drops through the sleeve and into the pocket 30 of the gate 28 with its end resting upon the table 22. As the can continues to be advanced by the edges of the can pockets immediately behind and following it the gate 28 is pushed aside, the can passes beneath the guide 32, and the edge of the plate 24 then diverts the can toward the chute 26. When the can reaches the stripping finger 27 it is deposited into the chute.

When the gauging sleeve embraces a dented or misshapen can, by reason of the increased diameter of the can, it cannot slide through the sleeve immediately as do the perfect cans, but is held in suspension by the opposed can pockets forming the sleeve until they have moved on past the point of tangency of the turrets and have diverged sufficiently to release the can. The result is that the dented can is carried past the pocket 30 in the gate 28 and when it is finally released by the gauging sleeve it is prevented from dropping onto the plate 22 by reason of its forward edge being above the protruding portion of the gate. As the can is then pushed forwardly by the edges of the can pockets immediately behind and following it, it is engaged by the guide 32 and pushed up over the edge of the plate 24 and into the chute 25. The cans thus separated may be delivered to their respective destinations by any suitable mechanism not shown.

Having now described my invention and in what manner the same may be used, what I claim as new and desire to protect by Letters Patent is:

1. An apparatus for grading cans comprising a pair of complementary can pockets movable over tangential circuitous paths, means for moving said pockets in timed relation to bring them together in each revolution to form a gauging sleeve, means for feeding cans into engagement with said pockets, and means for separating the cans into groups according to whether or not they are gripped between the pockets when the sleeve is formed.

2. An apparatus for grading cans comprising a pair of complementary can pockets movable over tangential circuitous paths, means for moving said pockets in timed relation to bring them together in each revolution to form a gauging sleeve, said pockets being of such size that a perfect can which will pass freely through said gauging sleeve will, when deformed, be gripped and held by the sleeve until the pockets diverge sufficiently to release it, means for feeding cans into engagement with said pockets, and means for separating those cans passing freely through the sleeve from those being gripped thereby before being released.

3. An apparatus for grading cans comprising a pair of complementary can pockets movable over adjacent circuitous paths, means for moving said pockets in timed relation to bring them together in each revolution to form a gauging sleeve, means for feeding cans into engagement with said pockets, means for supporting the cans until they are embraced by said sleeve, and means for separating those cans which drop through the gauging sleeve within a predetermined distance after being carried clear of the supporting means from those cans which are carried a greater distance before being released.

4. An apparatus for grading cans comprising a pair of complementary can pockets movable over adjacent circuitous paths, means for moving said pockets in timed relation to bring them together in each revolution to form a gauging sleeve, means for feeding cans into engagement with said pockets, means for supporting the cans until they are embraced by said sleeve, a runway extending from beneath the point where said sleeve is formed, and a gate yieldably disposed in said runway for directing into the runway those cans dropping through the gauging sleeve within a predetermined distance after being carried clear of the supporting means, said gate being disposed to prevent those cans from entering the runway which are carried a greater distance before being released.

5. An apparatus for grading cans comprising a pair of tangentially disposed turrets rotatable in a horizontal plane, a can receiving pocket in the periphery of each turret, means for rotating the turrets in timed relation to bring said pockets together to form a gauging sleeve, means for feeding cans into engagement with said pockets, means for supporting the cans until they are embraced by said sleeve, and means for separating those cans which drop through the gauging sleeve within a predetermined distance after being carried clear of the supporting means from those cans which are carried a greater distance before being released.

6. In a can grading apparatus, means for gauging cans including a pair of complementary can receiving members cooperable to form a can embracing sleeve, means for bringing together and separating said can receiving members to alternately form and open the sleeve, means for delivering cans into position for embracement by the sleeve formed by the can receiving members when the latter are brought together, and means for separately discharging the cans which are gripped between the can receiving members when the sleeve is formed and the cans which are freely slidable through the sleeve.

7. In a can grading apparatus, means for gauging cans including a pair of complementary can receiving members cooperable to form an upright can embracing sleeve, means for bringing together and separating said can receiving members to alternately form and open the sleeve, means for delivering cans into position for embracement by the sleeve formed by the can receiving members when the latter are brought together, means for supporting the cans until they are embraced by the sleeve, and means for directing the cans which are gripped between the can receiving members when the sleeve is formed and the cans passing freely through the sleeve to separate points of discharge.

8. An apparatus for separating perfectly shaped cans from deformed cans, comprising a pair of complementary can receiving members horizontally movable over tangential arcuate paths and cooperable to form an upright can embracing sleeve, means for moving said can receiving members in timed relation to bring them together in each cycle of operation to form said sleeve, means for feeding cans into registry with said can receiving members as they converge prior to forming the sleeve, means for supporting the cans until they are embraced by said sleeve, and means for separating the perfectly shaped cans from the deformed cans according to their position in the sleeve.

9. An apparatus for grading cans comprising a pair of complementary can receiving members horizontally movable over tangential arcuate paths and cooperable to form an upright can embracing sleeve, means for moving said can receiving members in timed relation to bring them together in each cycle of operation to form said sleeve, means for feeding cans into registry with said can receiving members as they converge prior to forming the sleeve, means for supporting the cans until they are embraced by the sleeve, said supporting means terminating adjacent the point where the sleeve is formed, a runway extending beneath the point where said sleeve is formed for receiving those cans which drop through the sleeve within a predetermined distance after being carried clear of the supporting means, and means for preventing those cans from falling into the runway which are carried a greater distance before being released.

ALBERT R. THOMPSON.